(12) United States Patent
Habacker et al.

(10) Patent No.: US 7,425,031 B2
(45) Date of Patent: Sep. 16, 2008

(54) CABRIOLET VEHICLE COMPRISING A RETRACTABLE TOP

(75) Inventors: Norbert Habacker, Bramsche (DE); Achim Böhnke, Tecklenburg (DE); Detlef Wasilewski, Osnabrück (DE)

(73) Assignee: Wilhelm Karmann GmbH, Osnabrück (DE)

( * ) Notice: Subject to any disclaimer, the term of this patent is extended or adjusted under 35 U.S.C. 154(b) by 428 days.

(21) Appl. No.: 10/533,786

(22) PCT Filed: Oct. 30, 2003

(86) PCT No.: PCT/DE03/03609

§ 371 (c)(1),
(2), (4) Date: Oct. 18, 2005

(87) PCT Pub. No.: WO2004/041572

PCT Pub. Date: May 21, 2004

(65) Prior Publication Data

US 2006/0197355 A1    Sep. 7, 2006

(30) Foreign Application Priority Data

Nov. 5, 2002  (DE) ................................ 102 51 409

(51) Int. Cl.
*B60J 7/185* (2006.01)
*B60J 7/20* (2006.01)
(52) U.S. Cl. ................................. 296/107.08
(58) Field of Classification Search ............ 296/107.01, 296/107.08, 136.01, 136.05, 136.06, 121
See application file for complete search history.

(56) References Cited

U.S. PATENT DOCUMENTS

| 5,267,769 A | * | 12/1993 | Bonne et al. ........... 296/107.08 |
| 5,295,722 A | | 3/1994 | Bonné et al. ................. 296/121 |
| 5,558,389 A | * | 9/1996 | Rothe et al. ............ 296/107.08 |
| 6,168,224 B1 | * | 1/2001 | Henn et al. ............ 296/136.06 |
| 6,227,604 B1 | * | 5/2001 | Grace ..................... 296/107.09 |
| 7,017,971 B2 | * | 3/2006 | Guillez et al. .......... 296/107.08 |

FOREIGN PATENT DOCUMENTS

DE   199 35 732   2/2001

* cited by examiner

*Primary Examiner*—H Gutman
(74) *Attorney, Agent, or Firm*—Gudrun E. Huckett

(57) ABSTRACT

A convertible vehicle has a carbody having a rear top compartment with a top compartment lid. A retractable top is connected to the carbody and stowed in the top compartment when open. Its back bow is placed onto the top compartment lid in a closed position of the top. A locking device secures the back bow and the top compartment lid to one another. The locking device has a connecting member on the back bow and a counter member on the top compartment lid below a through opening of the top compartment lid. At least one flap part is provided at the through opening and movable by the connecting member from a closed position into an open position. A switching member cooperates with the at least one flap part. The connecting member has two support legs that define a receiving slot for the counter member engaging the receiving slot positive-lockingly.

17 Claims, 6 Drawing Sheets

CABRIOLET VEHICLE COMPRISING A RETRACTABLE TOP

BACKGROUND OF THE INVENTION

The invention relates to a convertible vehicle comprising a retractable top, in particular, a folding top whose back bow, that can be placed at least partially onto a rearward top compartment lid in a closed position of the top, has at least one locking device arranged between it and the top compartment lid, wherein a connecting member provided on the back bow (9) can be secured on a counter member of the top compartment lid provided below a through opening and in whose area at least one flap part is provided that is movable by means of the connecting member and cooperates with a switching member.

In known retractable tops of convertible vehicles (EP 0 638 453 B1), a back bow provided on the folding top is resting in the closed position of the top on the top compartment lid. In this connection, the back bow and the top compartment lid are secured in the area of their respective locking devices by a catch hook as a connecting member that engages a cup-shaped locking member. The locking position is monitored by means of a microswitch actuated by the catch hook or a flap so that, in this way, the movement of the back bow into the open and closed positions can be controlled.

The invention concerns the problem of configuring a folding top of a convertible vehicle in the area of the back bow such that with minimal technical expenditure an improvement of the connecting stability is possible when the back bow rests on the top compartment lid.

SUMMARY OF THE INVENTION

Based on a convertible vehicle of the aforementioned kind, the invention solves this problem in that the locking device has at least two support legs as a connecting member and between them a receiving slot is formed that engages therebetween the counter member at least partially positive-lockingly. With respect to important additional configurations, reference is being had to the dependent claims.

In the convertible vehicle according to the invention, the folding top in the area of the back bow is provided with at least one locking device in which as a connecting unit two support legs as locking members interact with a counter member that is provided on the top compartment lid so that this module can take up with minimal technical expenditure also forces occurring transversely to the longitudinal center plane of the vehicle; in this way, the connecting stability, in particular, for receiving dynamic driving loads, is improved.

For securing the counter member provided on the top compartment lid, a securing part in the form of a support frame is provided that positions the counter member below the through opening frame on which two flap parts are supported that each close half of the through opening. These two flap parts are actuated simultaneously upon movement of the back bow by means of roller-shaped support elements provided on the support legs, respectively, wherein at least one of the flaps cooperates with an electric contactor in the form of a switch or the like and, in this way, a safe control of the open or closed position of the folding top and its back bow is possible.

BRIEF DESCRIPTION OF THE DRAWINGS

Further details and advantages of the invention result from the following description and the drawings that illustrate in detail one embodiment of the folding top according to the invention in the area of the locking device. The drawings show in.

DESCRIPTION OF PREFERRED EMBODIMENTS

Figure 1:
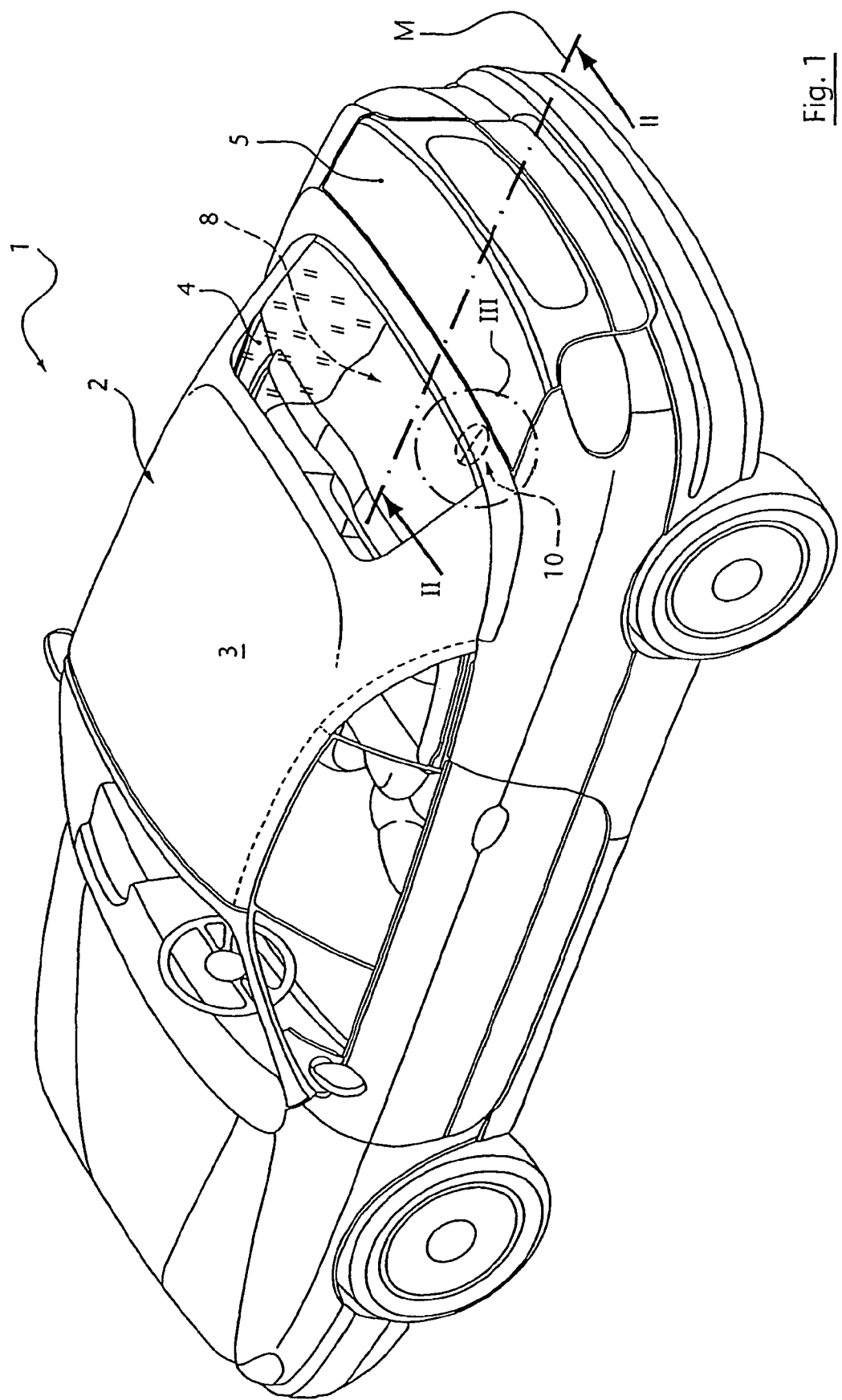
FIG. 1 a perspective rear view of a convertible vehicle with its folding top in the closed position.

In FIG. 1, a convertible vehicle identified by 1 is illustrated in a perspective view wherein its closed folding top 2 comprises a rear window 4 which is integrated into the roof skin 3. In the illustrated closed position of the folding top 2, the roof skin 3 rests in the rear area below the rear window 4 on a top compartment lid 8 (FIG. 2) that is positioned within the same plane as the trunk lid 5. By means of the top compartment lid 8 that extends essentially U-shaped within the rear contour of the carbody, the upper end of the top compartment 6 provided for receiving the top 2 can be closed.

The top compartment lid 8 is pivotably supported on the carbody by means of hinge devices 7 (FIG. 2; only one hinge device is illustrated) that are positioned opposed to one another mirror-symmetrically to the longitudinal center plane M of the vehicle, respectively. Starting at this hinge device 7, the top compartment lid 8 cooperates forwardly in the traveling direction F of the vehicle with at least one locking device 10 provided in the area of a laterally arranged back bow 9 (in FIG. 1, dashed illustration in the area III).

EP 0 638 453 B1 discloses that in the area of such locking devices 10 the top compartment lid 8 can be locked on the back bow 9 by a pivot-push movement and can be unlocked in the opposite direction. This movement is initiated by means of a hydraulic drive D (FIG. 2) and controlled by its cooperation with the hinge device 7. In an expedient configuration, the kinematics of the top has a second locking device 10' that is arranged mirror-symmetrically to the device 10 illustrated in FIG. 1.

Figure 2:
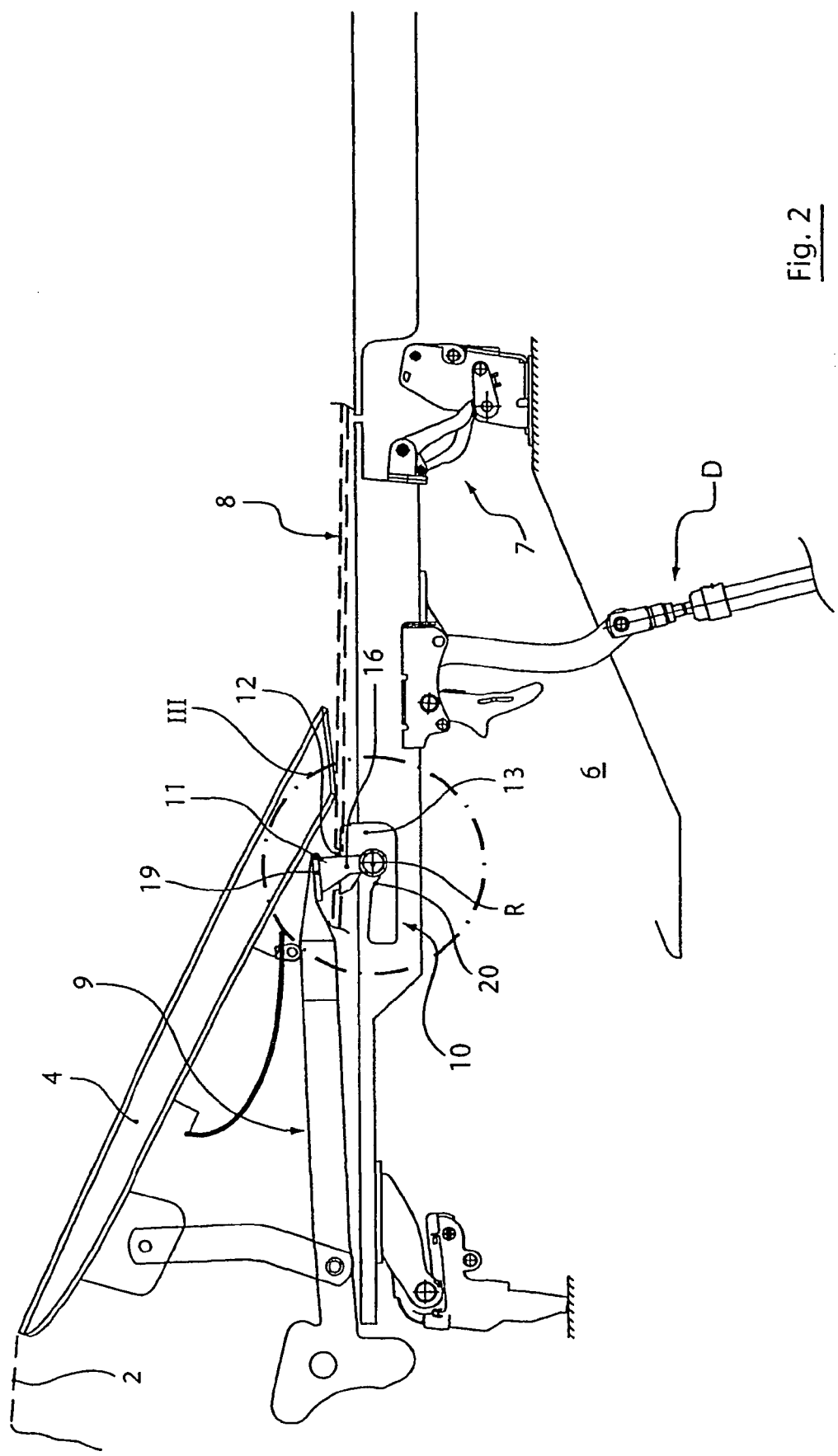
FIG. 2 a schematic detail illustration of the rear area of the vehicle according to line II-II in FIG. 1.
Figure 3:
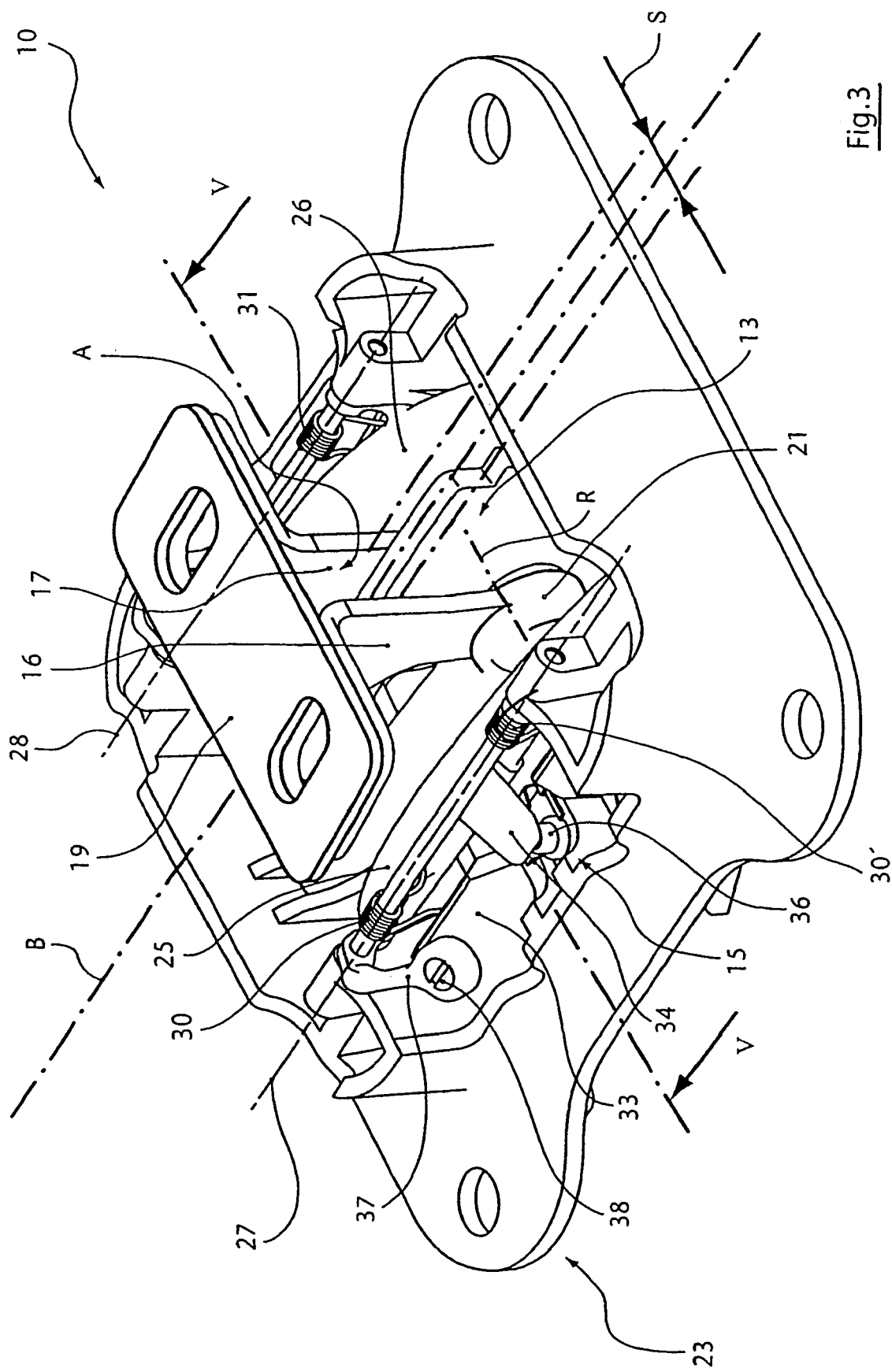
FIG. 3 a detail view of a locking device in detail area III according to FIG. 1.
Figure 6:
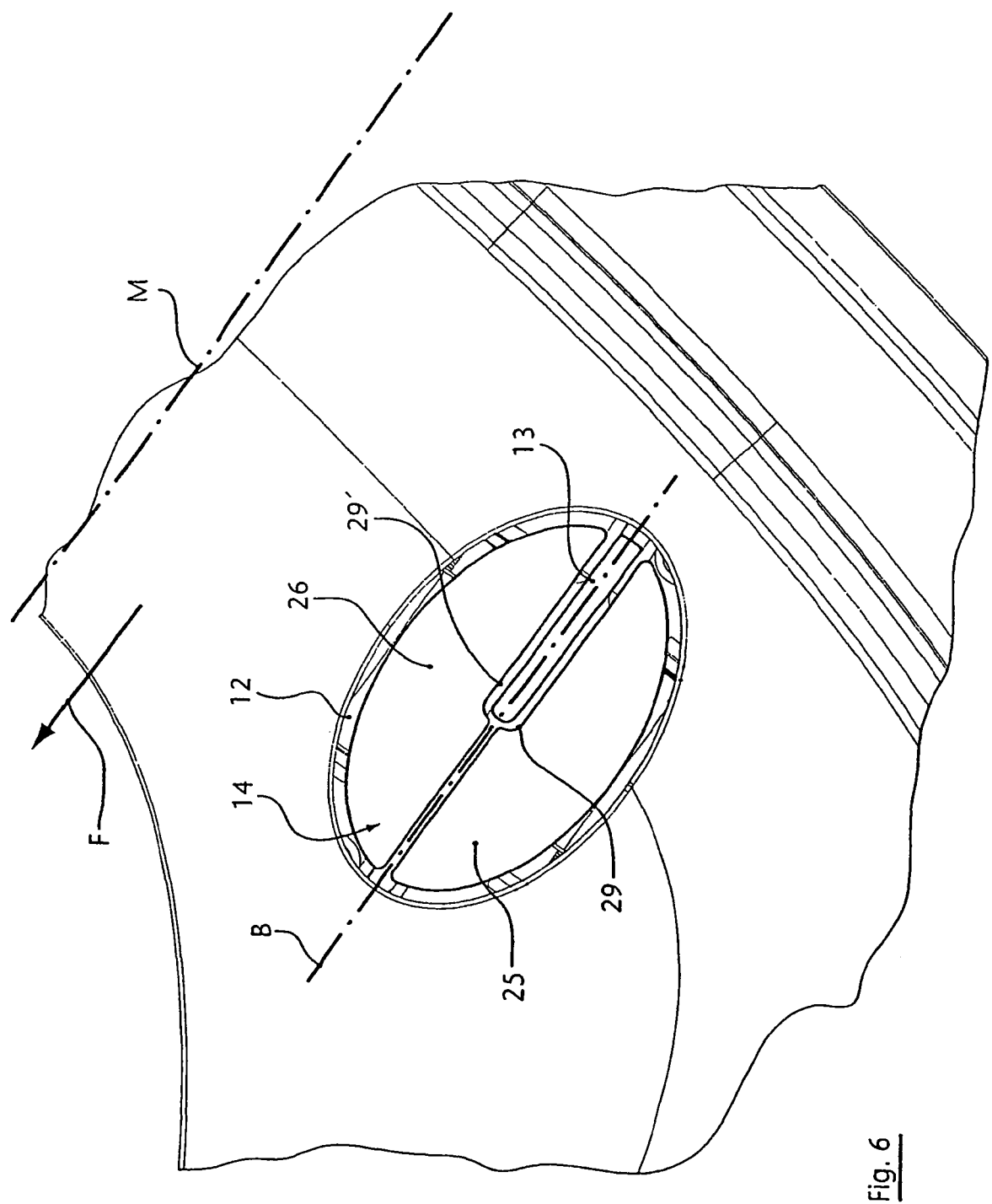
FIG. 6 an enlarged detail view of the area III of FIG. 1 with the folding top in the open position in which it has been moved below the top compartment lid at the rear.

FIG. 2 shows according to section illustration II the locking device 10 in more detail in the area of the back bow 9 and the top compartment lid 8. A connecting member 11 provided on the back bow 9 is secured on a counter member 13 which is provided below a through opening 12 on the top compartment lid 8. In the area of the through opening 12, a flap part 14 (FIG. 6), not illustrated in detail in FIG. 2, is provided that by means of the connecting member 11 can be moved out of the closed position and, by doing so, actuates a switch member 15 (FIG. 3).

In the embodiment according to the invention, the locking device 10 has two support legs 16 and 17 as a connecting member 11; they are secured as L-shaped parts on an intermediate plate 19 (FIG. 3) secured on the back bow 9. The two support legs 16 and 17 are arranged at a spacing S substantially mirror-symmetrically to the longitudinal center plane B of the locking device 10. In this way, the support legs 16 and 17 form a receiving slot A in which the counter member 13 can be received at least partially positive-lockingly when closing the folding top 2. This connecting position in the area of the locking device 10 is illustrated in particular in the perspective illustrations of FIGS. 3 and 4.

By mean of this connecting unit it is achieved that movements, for example, vibrations during movement of the vehicle, that are effective transversely and/or longitudinally to the longitudinal center plane B are received by the support legs 16 and 17 resting against the counter member 13, respectively, as the parts resting against one another substantially without play. The two support legs 16 and 17 have substantially the same length and form thus on the respective lateral surfaces of the counter member 13 contact pairs that stabilize and secure the back bow 9 with regard to transverse forces.

In an expedient configuration, the support legs 16 and 17 are connected by at least one transverse stay (not illustrated) extending in the direction of the transverse axis R (FIG. 2); the stay can be inserted in the area of the counter member 13 into a receiving depression 20. In this way, the connecting member 11 and the two support legs 16 and 17 are safely secured in the closed position of the top with respect to loads acting in the direction of the longitudinal center plane M of the vehicle.

Figure 4:
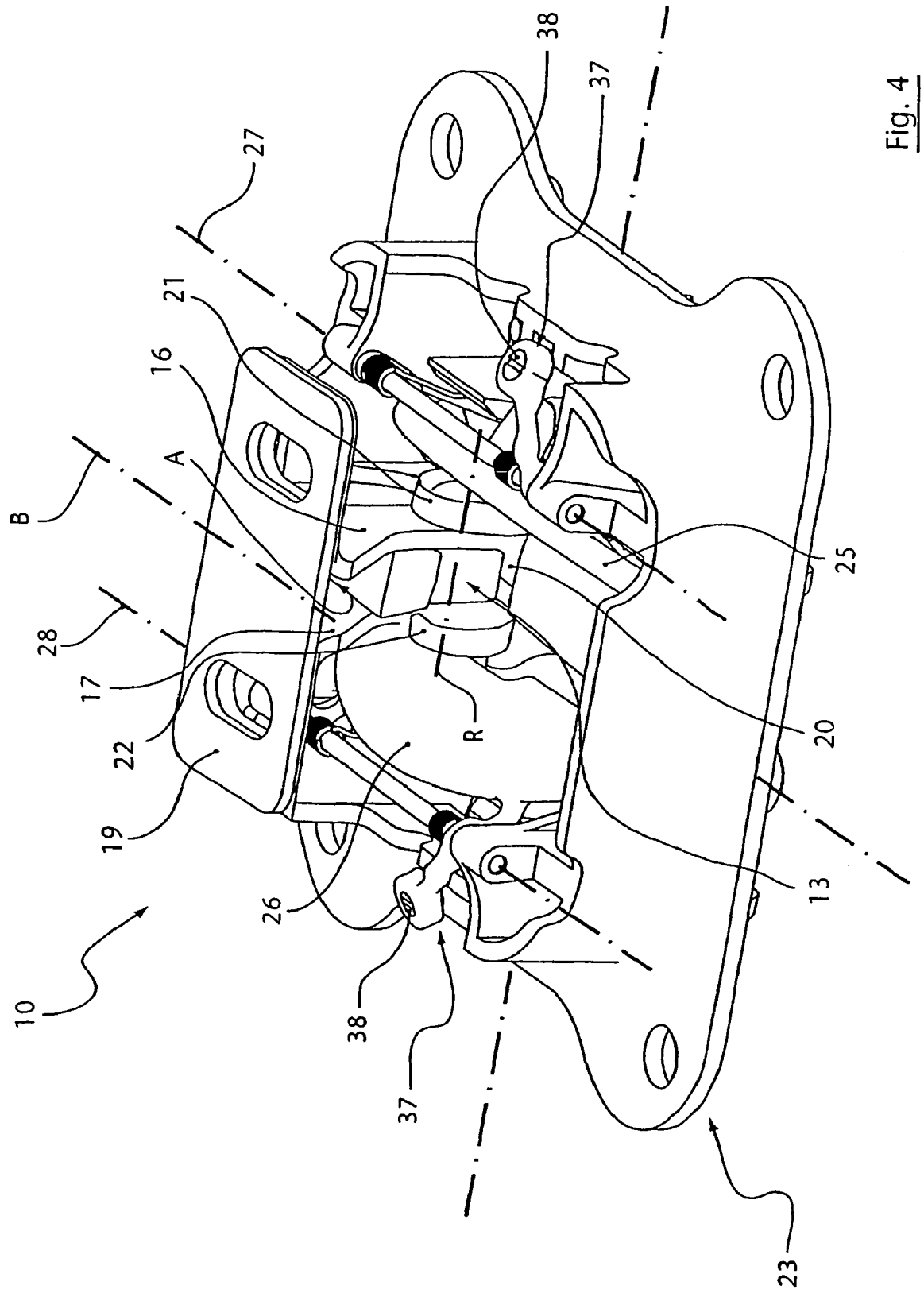
FIG. 4 a perspective front view of the locking device according to FIG. 3.

The illustrations according to FIGS. 3 and 4 illustrate that the support legs 16 and 17 are provided at their free end with a support projection 21, 22, respectively, that can be brought into contact laterally on the counter member 13. In an expedient embodiment, in the area of these two support projections 21, 22 the transverse stay, not illustrated in detail, is provided in the area of the axis R. In the illustrated embodiment, the support projections 21, 22 are roller-shaped wherein their circumferential contour projects past the end faces of the support legs 16, 17 such that, when moving the back bow 9, the roller-shaped support projections 21, 22 as projecting parts pass through the through opening 12 (FIG. 5) of the top compartment lid 8 and can be placed gently onto the flap 14.

Figure 5:
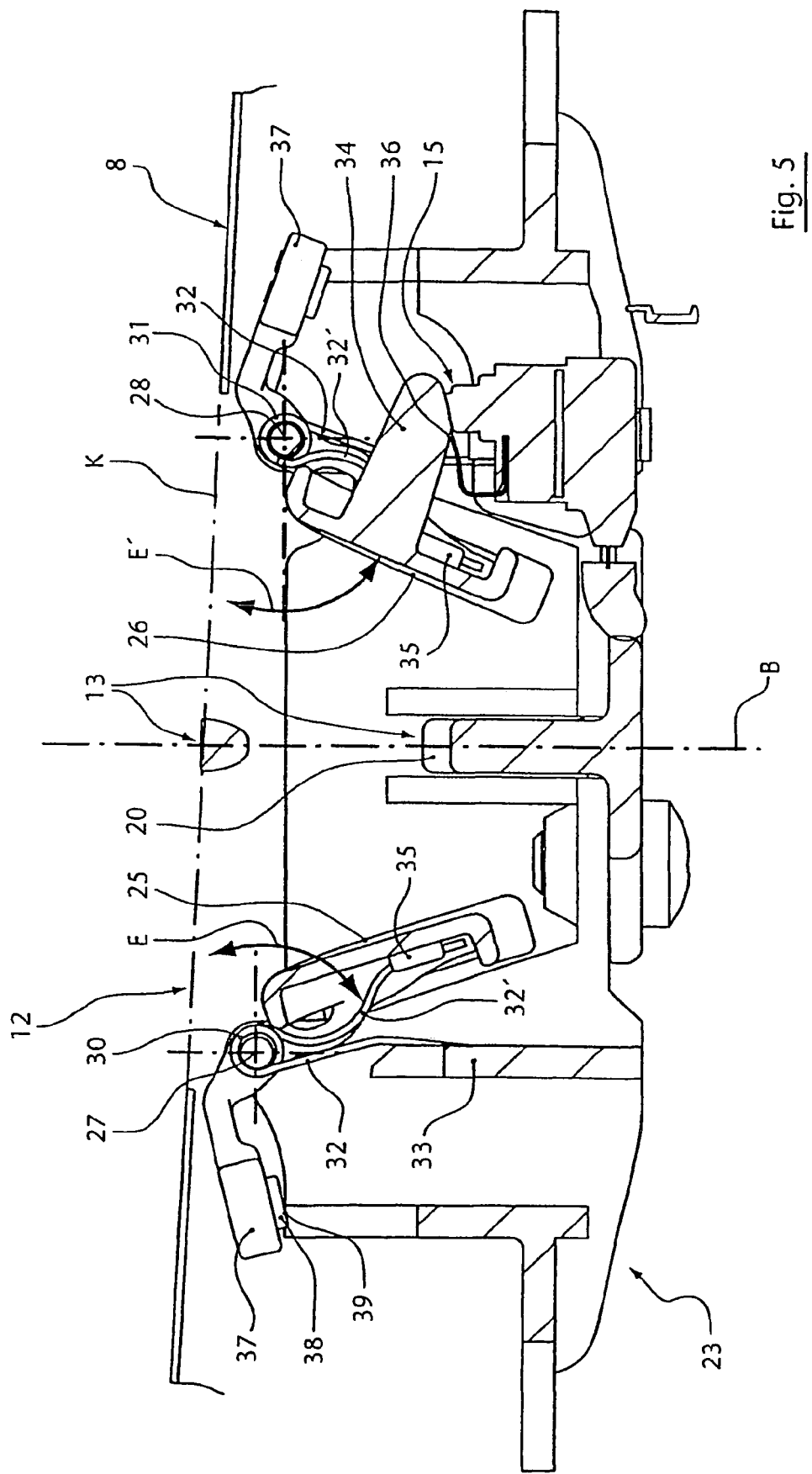
FIG. 5 a section illustration of the locking device according to line V-V in FIG. 3.

The individual illustrations of the locking device 10 according to FIGS. 3 through 5 show that the counter member 13 is supported on a support frame 23 forming a central shaped recess as a receiving opening and having a substantially rectangular contour (FIG. 4). In the mounted position (FIG. 5, FIG. 6), the through opening 12 is correlated with the area of the receiving opening of the support frame 23.

The support frame 23 is provided in the area of its receiving opening with two flap parts 25 and 26 forming the flap 14 whose support axle 27, 28 extends parallel to the longitudinal center plane B of the locking device 10, respectively. By means of these support axles 27 and 28 the flap parts 25 and 26 are secured opposed to one another in a closed position (FIG. 6) at the upper edge area of the counter member 13 and, from this position, they can be transferred by means of the support legs 16, 17 provided on the back bow 9 by being pivoted in the downward direction into the open position (FIG. 3 through FIG. 5). The two flap parts 25 and 26 in the area of their peripheral contour positioned opposite one another in the closed position (FIG. 6) are provided with a shaped recess 29, 29' in which the counter member 13 can be received such that the flap parts 25, 26 can be moved without impairment when carrying out their opening and closing movement (FIG. 5, arrows E, E').

The flap parts 25, 26 that can be pivoted downwardly by the support legs 16 and 17 are provided at their bottom side with a restoring spring 30, 31 surrounding the support axle 27, 28, respectively, so that the flap parts 25 and 26 upon return movement are pivoted upwardly to a contour plane K (FIG. 5, dashed line) and, when doing so, close the through opening 12 almost completely. The flap parts 25 and 26 are adjusted such that even a slant of the contour plane K is compensated in a visually pleasing way. The restoring springs 30, 31 are supported with their free leg 32 on a support plate 33 of the support frame 23, respectively, and the spring legs 32' are attached on a support part 35 of the flap part 25, 26, respectively.

The section illustration according to FIG. 5 illustrates that at least the flap part 25 is provided at the rear with a sensing lever 34 that, when the flap part 25 is pivoted into the open position, can be placed onto a contact area 36 of the switching member 15 so as to provide electric contact. In this way, the open and closed positions of the back bow 9 can be monitored with minimal expenditure. Also, it is conceivable that the two flap parts 25, 26 each have a sensing lever (not illustrated).

The two flap parts 25 and 26 in the area of their two support axles 27 and 28 are provided with an adjusting module 37 that can be adjusted by a screw 38 as a movable contact part such that the flap parts 25, 26 can be adjusted optimally to the closed contour K of the top compartment lid 8 (FIG. 5). In the closed position (not illustrated), the screw 38 rests with its support surface 39, for example, on the support plate 33 such that the upwardly pointing cover surface of the flap part 25, 26 extends flush with the closed contour K.

In the area of the support frame 23 there is also an adjusting screw 48 at the bottom with which a contact position can be defined that delimits the engagement depth of the support legs 16, 17.

What is claimed is:

1. A convertible vehicle comprising:
a carbody having a rear top compartment with a top compartment lid;
a retractable top connected to the carbody and stowed in an open position of the retractable top in the rear top compartment, wherein the retractable top has a back bow placed at least partially onto the top compartment lid in a closed position of the top;
at least one locking device for securing the back bow and the top compartment lid to one another, wherein the at least one locking device comprises a connecting member provided on the back bow and a counter member provided on the top compartment lid below a through opening of the top compartment lid;
at least one flap part provided at the through opening;
wherein the at least one flap part is movable by the connecting member from a closed position into an open position;
a switching member cooperating with the at least one flap part;
wherein the connecting member has at least two support legs and wherein the at least two support legs define a receiving slot therebetween;
wherein the counter member engages the receiving slot at least partially positive-lockingly.

2. The convertible vehicle according to claim 1, wherein the at least two support legs are arranged substantially parallel to a longitudinal center plane of the convertible vehicle and mirror-symmetrical at a spacing to a longitudinal center plane of the at least one locking device, wherein the counter member extends along the longitudinal center plane for engaging the receiving slot.

3. The convertible vehicle according to claim 1, comprising two of the at least one locking device in a connecting area between the top compartment lid and the back bow, wherein said two locking devices are positioned opposite one another substantially mirror-symmetrically to the longitudinal center plane of the convertible vehicle.

4. The convertible vehicle according to claim 1, wherein the at least two support legs and the counter member define a support connection that receives movements of at least one of the back bow and the top compartment lid, which movements are effective in at least one of a transverse direction and a longitudinal direction relative to the longitudinal center plane of the convertible vehicle.

5. A locking device for a convertible vehicle which convertible vehicle comprises a carbody having a rear top compartment with a top compartment lid; a retractable top connected to the carbody and stowed in an open position of the retractable top in the rear top compartment, wherein the retractable top has a back bow placed at least partially onto the top compartment lid in a closed position of the top; wherein the locking device secures the back bow and the compartment lid to one another, the locking device comprising:
- a connecting member provided on the back bow;
- a counter member provided on the top compartment lid below a through opening of the top compartment lid;
- wherein the connecting member has at least two support legs and wherein the at least two support legs define a receiving slot therebetween;
- wherein the counter member engages the receiving slot at least partially positive-lockingly; and
- wherein the at least two support legs rest with substantially identical length against the counter member.

6. The locking device according to claim 5, wherein the at least two support legs are connected to one another by at least one transverse stay and the counter member has a receiving depression into which receiving depression the transverse stay is inserted.

7. The locking device according to claim 6, wherein the at least two support legs have free ends, respectively, that are provided with a support projection resting laterally against the counter member.

8. The locking device according to claim 7, wherein the at least two support legs are connected to one another by the transverse stay in the area of the support projections.

9. The locking device according to claim 5, wherein the support projections are roller-shaped and have a peripheral contour that projects past end faces of the at least two support legs.

10. The locking device according to claim 5, wherein the counter member is provided on a support frame having a central shaped recess as a receiving opening, wherein the support frame is secured on the top compartment lid below the through opening on the top compartment lid.

11. The locking device according to claim 10, wherein, in the area of the receiving opening, the support frame is provided with two flap parts having a support axle, respectively, that extends parallel to a longitudinal center plane of the locking device.

12. The locking device according to claim 11, wherein the two flap parts are secured in opposing closed position at the upper edge area of the counter member and are transferable from the closed position into an open position by pivoting downwardly when acted upon by the at least two support legs provided on the back bow.

13. The locking device according to claim 12, wherein the two flap parts have opposed peripheral contours in the closed position and the opposed peripheral contours each have a shaped recess for receiving partially the counter member.

14. The locking device according to claim 12, wherein the two flap parts each have a support axle and a restoring spring arranged at an underside of the two flap parts, respectively, wherein the restoring springs surround the support axles, respectively, and are supported on the support frame.

15. The locking device according to claim 11, wherein at least one of the two flap parts has a back provided with a sensing lever, wherein the sensing lever is positioned, when the two flap parts are pivoted into the open position, on an electric switching member so as to provide electric contact.

16. The locking device according to claim 15, wherein the two flap parts each have a sensing lever.

17. The locking device according to claim 11, wherein the two flap parts each have an adjusting module provided with a movable contact part, wherein the closed position of the two flap parts is adjustable, respectively, by adjusting the movable contact part.

* * * * *